United States Patent [19]

Geise et al.

[11] 4,253,187
[45] Feb. 24, 1981

[54] METHOD AND APPARATUS FOR SEQUENCING TWO DIGITAL SIGNALS

[75] Inventors: Heinz-Dieter Geise, Seeheim-Jugenheim; Karl-Heinz Hoppe, Darmstadt-Wixhausen, both of Fed. Rep. of Germany

[73] Assignee: Robert Bosch GmbH, Stuttgart, Fed. Rep. of Germany

[21] Appl. No.: 28,710

[22] Filed: Apr. 10, 1979

[30] Foreign Application Priority Data

Apr. 10, 1978 [DE] Fed. Rep. of Germany ....... 2815423

[51] Int. Cl.³ .................... H04L 27/18; H04L 7/02
[52] U.S. Cl. ............................. 375/110; 375/55
[58] Field of Search .................. 178/66 R, 67, 69.1; 360/26, 27, 28, 44, 51; 328/63, 72, 155; 358/264, 265; 375/52, 55, 110, 111, 114; 370/100

[56] References Cited

U.S. PATENT DOCUMENTS

| | | | |
|---|---|---|---|
| 3,417,332 | 12/1968 | Webb | 178/66 R |
| 3,458,835 | 7/1969 | Saeger | 358/264 |
| 4,127,878 | 11/1978 | Johnson, Jr. | 360/51 |
| 4,143,407 | 3/1979 | Liberty | 360/51 |

OTHER PUBLICATIONS

"Journal of the Society of Motion Picture and Television Engineers", Jun. 1973, vol. 82, pp. 482–491.
European Broadcast Union Document Tech. 3097.

Primary Examiner—Benedict V. Safourek
Attorney, Agent, or Firm—Frishauf, Holtz, Goodman & Woodward

[57] ABSTRACT

A first self-timing signal bi-phase-mark coded and having a data portion and a synchronization portion is to be sequenced by a second signal also having a data and a synchronization portion. The signals derived by differentiating only the level change at the end of each bit cell phase-lock an oscillator whose output provides the basic timing for a modulator stage. In the modulator stage, a flip-flop first changes state under control of the first signal. At the start of the synchronization portion of the first signal, a comparator furnishes a signal which switches control of the flip-flop to signals derived from differentiation of the second signal. When the second signal is binary coded, a NAND gate modulates the pulses from the second signal by pulses resulting from differentiating negative going edges of the signal derived from the phase-locked oscillator to create a signal for controlling the flip-flop so that it changes state in accordance with a bi-phase-mark code.

9 Claims, 4 Drawing Figures

METHOD AND APPARATUS FOR SEQUENCING TWO DIGITAL SIGNALS

The present invention relates to methods and apparatus for combining a first and second digital signal into a sequence wherein the second signal has the correct phase relationship to the first signal. More specifically, it relates to such a method and apparatus for sequencing of two signals, each of which has a data portion alternating with a synchronization portion.

BACKGROUND AND PRIOR ART

A system is described in the publication "Journal of the Society of Motion Picture and Television Engineers" June 1973, Volume 82, pages 482–491 in which a binary coded signal indicative of each position of a video tape is recorded in a longitudinal track of the tape. The signal consists of a pulse sequence of 80 bit data words and contains time data in the form of hour, minute, second, and frame number as well as synchronization information. The time data takes up the first 64 bits while the synchronization portion requires the remaining 16 bits. The signal is coded in a bi-phase-mark code which is a self-timing code in worldwide use and which has been elevated to a standard by the European Broadcast Union in E.B.U. Technical Document 3097. In this code a logic "0" is indicated by a level change at the end of the bit, while a logic "1" is represented by an additional level change in the middle of the bit cell. Depending on the information content, such an 80 bit word may have different instantaneous levels in any one specified place, for example in the middle or at the end of the word. When sequencing two signals to be recorded onto the longitudinal track of the video tape, it is necessary that the data portions are recorded continuously and without error. For this purpose a code reader must be provided which reads the data portion at the end of the previous recording, recognizes this portion and phase synchronizes the timing code generator required for generating the data signals. Under these circumstances the transition from the readout to the recorded signal can take place anywhere within the 80 bit word.

In tight sequencing of two phase-shifted signal trains, either too many or too few bits may appear in the sequenced signal or undesired amplitude changes can result during the sequencing which decrease or totally prevent the possibility of a true evaluation of the sequenced signals.

An error recognition system is described in DE-PS 25 03 296 in which advantage is taken of the fact that within the 64 bit data portion of each word certain bits are always unoccupied and therefore will have the same value within each 80 bit word. The system contains an AND gate which receives a first signal when the synchronization portions of the two signals are in coincidence and a second signal upon coincidence of the unoccupied data bits. Only signals which have been tested for coincidence twice in this manner are used for evaluation. However, this error recognition system depends upon the presence of unoccupied data bits. This is undesirable in that these bits may be required for use at some other time.

THE INVENTION

It is an object of the present invention to furnish a method and system wherein the two signals to be sequenced do not have to have unoccupied data bit cells. Further, the apparatus is to be built up of only a few logic building blocks, resulting in an inexpensive unit which does not require much space. It is also to be suitable for construction as an integrated circuit.

In accordance with the present invention, a first signal has a data portion and a synchronization portion. This signal is continued by a second signal also having a data portion and a synchronization portion which is phase-locked to the first signal during the synchronization portion thereof.

DRAWING DESCRIBING A PREFERRED EMBODIMENT

Figure 1:
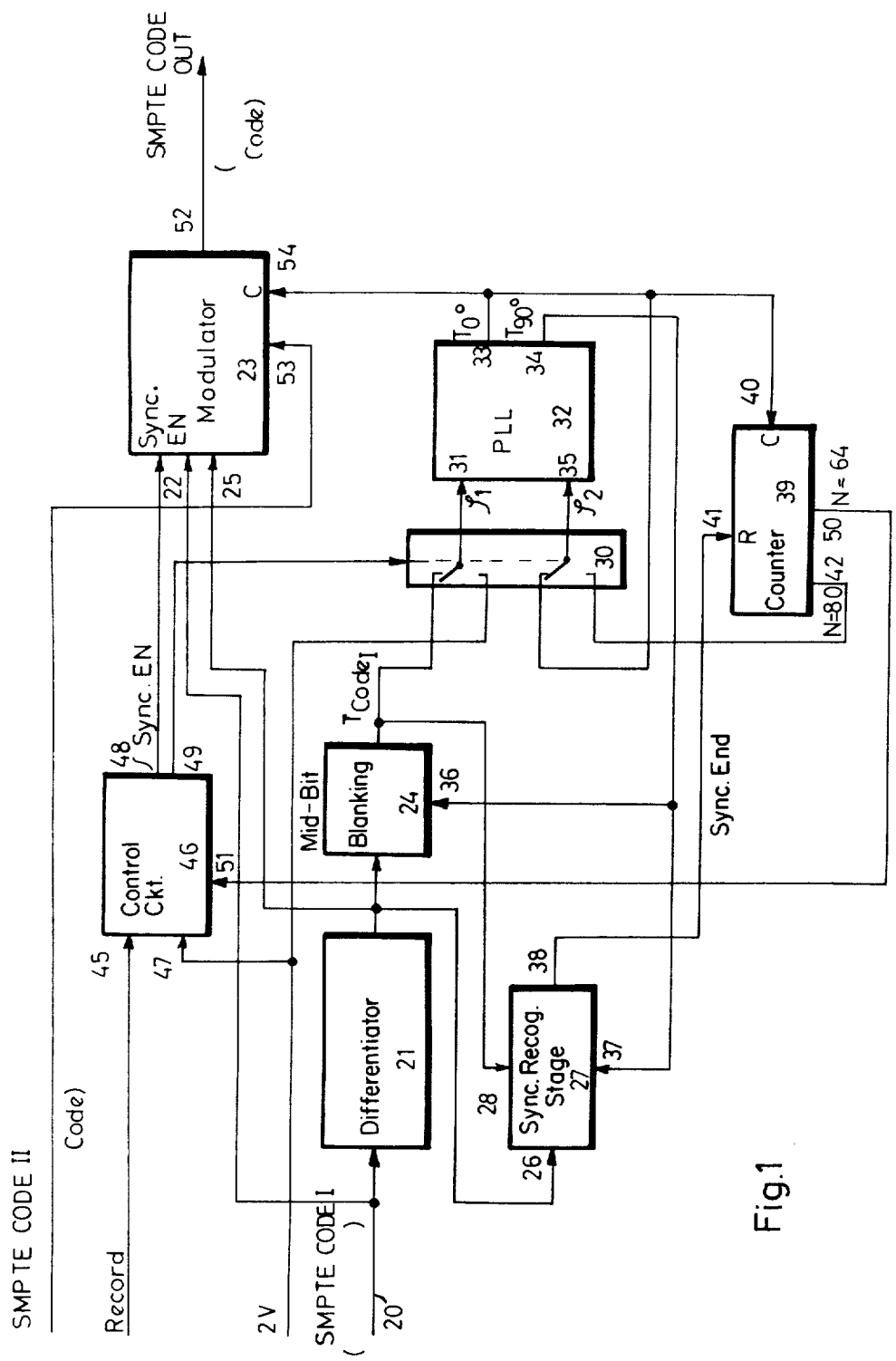
FIG. 1 is a schematic diagram of a circuit for continuing a self-timing signal with a second signal.

Referring now to FIG 1, the signal applied to terminal 20 at the input of a differentiating circuit 21 is a signal derived from a storage, for example the longitudinal track of a magnetic tape. The signal comprises a data portion including, e.g. timing information and a synchronization portion and has been subjected to amplification and limiting as required before being applied to input 20. The signal is herein referred to as the first signal. It is also applied to an input 22 of a modulator 23. Differentiating circuit 21 differentiates each edge of the signal, the signal being coded in the bi-phase-mark code described above. The pulse train at the output of differentiating circuit 21 is applied to a blanking stage 24, a second input 25 of modulator 23, as well as an input 26 of a synchronization portion recognition stage 27. The output of blanking stage 24 is applied to a further input 28 of stage 27. It is also applied to one terminal of a selector switch 30 which, when in the position shown in FIG. 1 applies the signals at the output of stage 24 to an input 31 of a phase-locked loop 32. Stage 32 includes a voltage controlled oscillator whose control voltage is derived from a phase comparator. Stage 32 has a first output 33 and a second output 34. The signals at output 34 are phase shifted by ninety degrees relative to those at output 33. Specifically, the zero degree phase is available at output 33 while the ninety degree phase is available at output 34. The signal $T_0°$ at output 33 is fed back to the second input 35 of phase comparator 32. The signal at output 34 of stage 33 is applied to one input 36 of blanking stage 24 so that it suppresses the pulse resulting from any change in the level during the middle of a bit cell. The output of stage 24 is therefore a pulse train each pulse of which is generated at the end of a bit cell. The signal at output 34 of stage 32 is further applied to an input 37 of the synchronization portion recognition stage 27. Stage 27 thus receives a pulse train containing both the differentiated synchronization portion and the differentiated data portion of the first signal at input 26, a signal signifying only the end of each bit at input 28 and a signal at the center of each bit cell at input 37. A comparator within stage 27 compares the bit pattern of the synchronization portion with a predetermined bit pattern and causes a pulse to be generated at output 38 at the end of each complete word.

A frequency divider 39 includes a counter whose counting input 40 is supplied with the signal $T_0°$ at output 33 of stage 32. Counter 39 further has a reset input 41 which is connected to output 38 of stage 37. Counter 39 is therefore reset at the end of the synchronization portion of each word. Following the resetting, counting again takes place in synchronism with the signal $T_0°$. At the output labelled N=80 a signal is therefore furnished which occurs at the repetition rate of the words in signal 1. This signal is applied to a further input of selector switch 30. The last input of selector switch 30 receives a signal 2 V which is a pulse occurring at the frame rate of the television signal. The two last-mentioned contacts of the selector switch are disconnected from inputs 31 and 35 of stage 32 when the selector switch is in the position shown in FIG. 1.

The instruction "record" for continuing the signal is applied to an input 45 of a control circuit 46. The signal 2 V is applied to a second input 47 of control circuit 46. Control circuit 46 contains a storage, such as a flip-flop, which is flipped to a predetermined state only when the signal 2 V is received following the "record" instruction. It should be noted that the signal 2 V, that is the frame repetition rate of the television signal, occurs simultaneously with the start of a word of signal 1. In response to the setting of the flip-flop, a signal is generated at the output 48 of control circuit 46. The signal is terminated when the signal N=64 at output 50 of counter 39 is applied to an input 51 of control circuit 46. Specifically, the counting output signal furnished by counter 39 after having counted 64 counts resets the above-mentioned flip-flop in control circuit 46. After a slight delay, a signal at an output 49 of control circuit 46 causes selector switch 30 to be switched to the second position wherein input 31 receives the signal 2 V while input 35 receives the signal N=80. The start of each word is thus phase-locked to the frame repetition rate signal.

Figure 2:
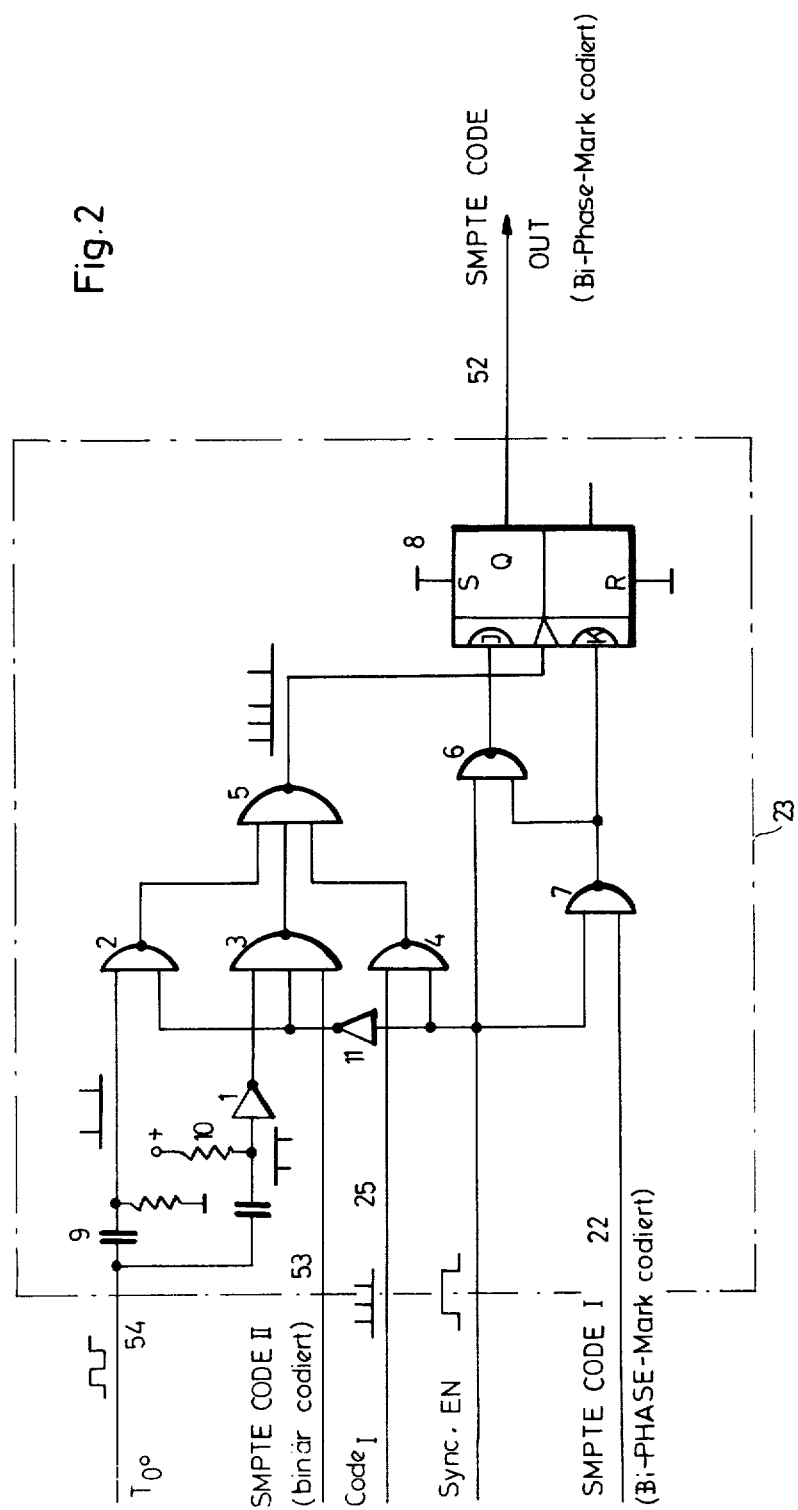
FIG. 2 is a schematic diagram of a circuit for phase-locked modulation of a bi-phase-mark coded signal.

FIG. 2 is a more detailed diagram of modulator 23 of FIG. 1. While the pulse is present at output 48 of control circuit 46, the bi-phase-mark coded signal is applied via NAND gates 6 and 7 directly to the J input and inverted to the K input of a flip-flop 8. A further NAND gate 4 causes the pulses from input 25 of modulator 23 to be applied, via another NAND gate 5, to the timing input of flip-flop 8. Line 52 at the Q output of flip-flop 8 therefore carries the bi-phase-mark coded signal present at input 22 of modulator 23 while the pulse at output 48 of control circuit 46 is present.

When the pulse at output 48 of control circuit 46 ends, that is at count N=64 of counter 39, gates 6 and 7 are blocked and a "1" signal is applied to the J and K inputs of flip-flop 8. The output $T_0°$ of phase-locked loop 32 is present at input 54 of modulator 23. The positive edges of this signal are differentiated by a differentiator 9. These pulses are applied to one input of a NAND gate 2 whose other input receives a "1" signal from the output of an inverter 11 following suppression of the pulse at output 48 of control circuit 46. The pulse sequence at the output of NAND gate 2 is transmitted through NAND gate 5 to the timing input of flip-flop 8. The negative edges of the signal at input 54 are differentiated by a differentiator 10, inverted by an inverter 1 and applied to one input of a NAND gate 3 which has a second input connected to the output of inverter 11 and a third input receiving the signal which is to follow the first signal, namely a binary coded second signal.

In NAND gate 3 a modulation of the pulses resulting from differentiation of the negative going edges of signal $T_0°$ takes place. The output signals of NAND gate 3 are applied to a further input of NAND gate 5 and the resulting signals at the output of NAND gate 5 are applied to the timing input of flip-flop 8. The state of flip-flop 8 had remained constant since the termination of the pulse at output 48 of control circuit 46. The change of state is now controlled by the output of NAND gate 5 resulting from signals furnished at the outputs of NAND gates 2 and 3, that is the state of flip-flop 8 is switched in accordance with the second signal. The resulting signal on line 52, that is at the output of flip-flop 8, is a signal which starts with the bi-phase-mark coded first signal and continues with a bi-phase-mark coded second signal locked in phase to the first signal.

Figure 3:
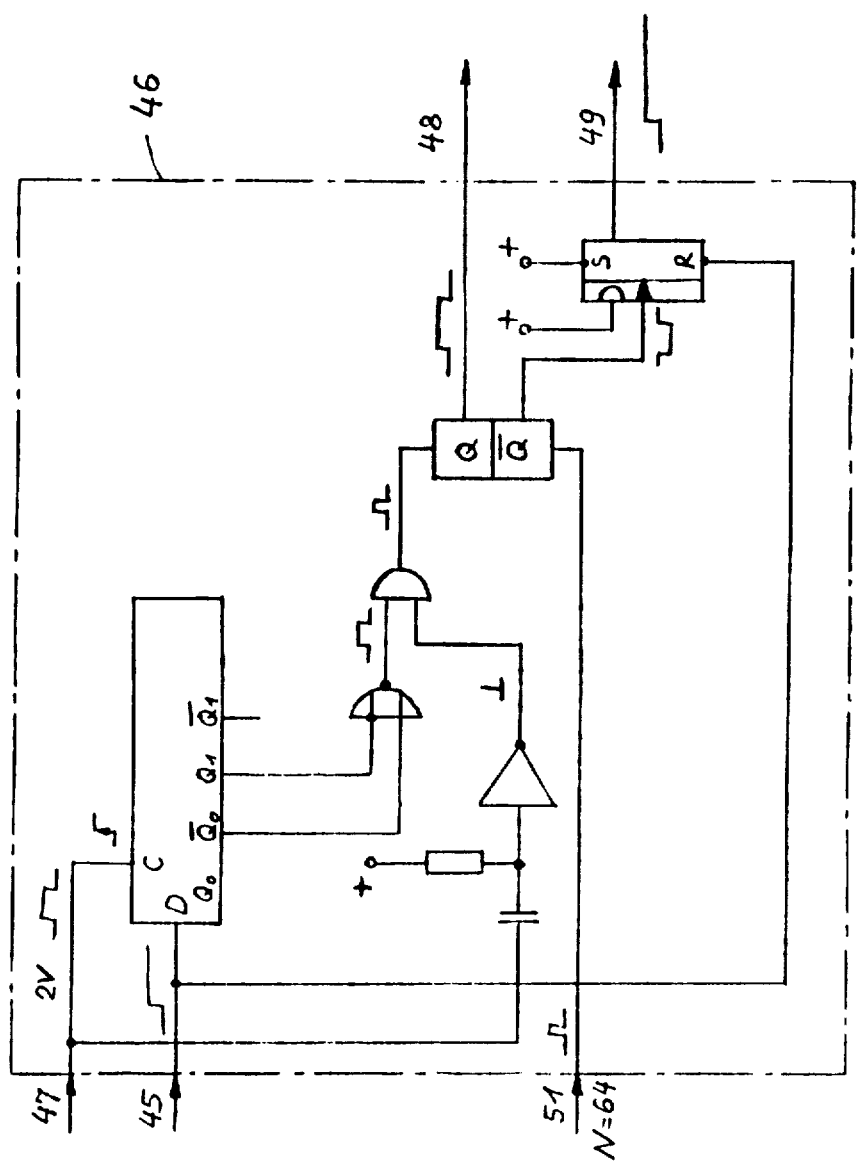
FIG. 3 is a schematic diagram of a control circuit suitable for use in the system of FIG. 1.

In FIG. 3, the 2 V pulse at the input 47 is applied to the clock input of a shift register 101. The record signal at input 45 is applied to the data input of the same shift register. In the shift register, the record signal is delayed by a period of 2 V (output $\overline{Q}_0$) and is further delayed by twice this amount (output $Q_1$). The two delayed record signals are applied to a NOR gate 102, thereby generating a gating pulse at the output of the NOR gate. The leading edge of the sequence of 2 V pulses at input 47 is differentiated in an RC circuit 103 and, after inversion in an inverter 104 applied to the input of an AND gate 105. The other input of AND gate 105 receives the pulse at the output of NOR gate 102. A pulse synchronous to the 2 V pulse is thus generated at the output of AND gate 105 and is applied to the S input of an RS flip-flop 106. Flip-flop 106 is reset with the pulse N=64 applied to input 51. The pulse at the Q output of flip-flop 106 is the pulse labeled "sync. EN" in FIG. 1, that is the pulse at output 48 of control circuit 46. The "sync. EN" pulse controls modulator 23 (FIG. 2) to transmit the phase of the first signal.

A D flip-flop 107 is enabled by the record signal applied to its R input. Flip-flop 107 is set to a positive level by the positive trailing edge of the $\overline{Q}$ output of flip-flop 106. This causes a positive signal to appear at output 49 of control circuit 46. This signal switches selector switch 30 to its second position, that is the position not illustrated in FIG. 1.

Figure 4:
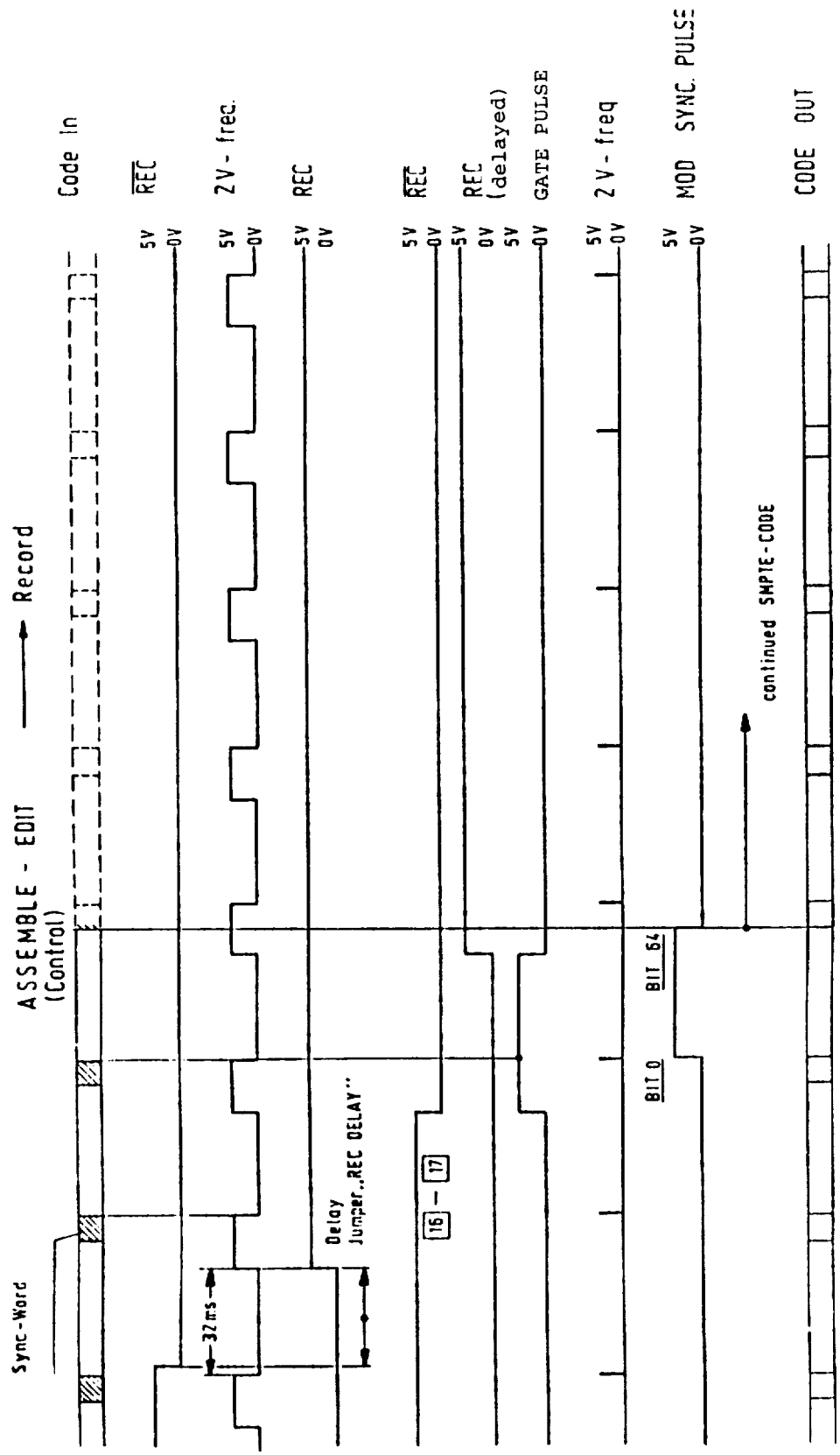
FIG. 4 is the wave form diagram showing signal variations at selected points in the circuit of FIG. 3.

FIG. 4 shows wave forms at various points in the circuit of FIG. 3. The lines in FIG. 4 are labeled with circled reference numerals corresponding to similarly labeled reference points in FIG. 3. No further discussion of FIG. 4 is required.

Various changes and modifications may be made within the scope of the inventive concepts.

We claim:

1. Method for creating a sequenced signal by continuing a self-timing first signal having alternate data and synchronization portions with a second signal having alternate data and synchronization portions, said synchronization portions of said second signal having a "1" and a "0" pattern identical to the "1" and "0" pattern of said synchronization portion of said first signal, said first signal being coded so that "1" and "0" bits are represented by changes between a first and second signal level, whereby the initial level of each of said synchronization portions of said first signal varies in dependence upon the signal level at the end of the last previous one of said data portions, the improvement comprising the steps of creating a signal level on a predetermined line (52) corresponding to said signal level at said end of said data portion of said first signal;

switching said signal level on said predetermined line in accordance with said "1" and "0" pattern of said synchronization portions of said first and second signals throughout said synchronization portion, said switching being controlled by said second signal after a predetermined time instant in said synchronization portion; and thereafter switching said signal level on said predetermined line in accordance with said second signal, whereby said level changes on said predetermined line constitutes said sequenced signal.

2. A method as set forth in claim 1, wherein said predetermined time in said synchronization portion is the start of said synchronization portion.

3. A method as set forth in claim 1, wherein said first signal is a biphase mark coded signal and said second signal is a binary coded signal;

further comprising the step of generating timing signals ($T_{0^\circ}$, $T_{90^\circ}$) at time instants corresponding to the end and middle of each of said bits in said first signal; and wherein switching said signal level on said predetermined line under control of said second signal comprises switching said signal level in response to timing signals indicative of said middle of said bit only in the presence of a "1" bit in said second signal and in response to a timing signal signifying said end of said bit in the presence of a "0" bit of said second signal.

4. Apparatus for creating a sequenced signal by continuing a self-timing first signal having alternate data and synchronization portions with a second signal having alternate data and synchronization portions, said snchronization portions of said second signal having a "1" and "0" pattern identical to the "1" and "0" pattern of said synchronization portion of said first signal, said first signal being coded so that "0" and "1" bits are represented by changes between a first and second signal level, whereby the initial level of said synchronization portion of said first signal varies in dependence upon the signal level at the end of the data portion last preceding said synchronization portion, the improvement comprising first means (8) for changing the signal level on a predetermined line (52) in response to level control signals applied thereto;

second means (6, 7) connected to said first means for applying level control signals to said first means so that said signal level on said predetermined line corresponds to said signal level at the end of said data portion of said first signal;

and third means (2-5, 11) connected to said first means for applying level control signals switching said signal level on said predetermined line in accordance to said "1" said "0" pattern of said synchronization portions of said first and second signals during said synchronization portion, said switching being controlled by said second signal after a predetermined time instant in said synchronization portion, and thereafter applying said level control signals to said first means under control of said second signal.

5. Apparatus as set forth in claim 4, wherein said time instant in said synchronization portion is the start of said synchronization portion.

6. Apparatus as set forth in claim 4, wherein said first signal is a biphase mark coded signal and said second signal is a binary coded signal;

further comprising means (32) for generating first and second timing signals respectively indicative of the start and middle of a bit cell in said first signal; and wherein said third means comprises means for furnishing a level control signal switching said level on said predetermined line in response to joint presence of said second timing signal and a "1" bit in said second signal, and in response to a "0" bit of said second signal in the presence of said first timing signal.

7. Apparatus as set forth in claim 4, wherein said first means comprises a flip-flop.

8. Apparatus as set forth in claim 6, further comprising differentiating means (21) for differentiating said first signal and furnishing differentiator output signals indicative of the start and middle of each bit cell in said first signal;

means (24) connected to said differentiating means for suppressing said differentiator output signal indicative of said middle of said bit cells, thereby furnishing suppressor output signals indicative of the start of each of said bit cells; and wherein said timing signal furnishing means furnishes said timing signals phase locked to said suppressor output signals while said level switching on said predetermined line is controlled by said first signal.

9. Apparatus as set forth in claim 8, wherein said data portions of said first and second signals comprise data identifying frames in a television signal;

further comprising means for furnishing vertical synchronization signals synchronizing said frames of said television signals, and switch means (30) for connecting said timing signal furnishing means to said suppressor means while said first signal is furnishing said level control signals, and to said vertical synchronization signal furnishing means while said second signal is furnishing said level control signals.

* * * * *